July 10, 1928.
K. KUNZEL
1,676,267
PROCESS OF MAKING GLASS IN A SHAFT FURNACE
Filed March 18, 1927
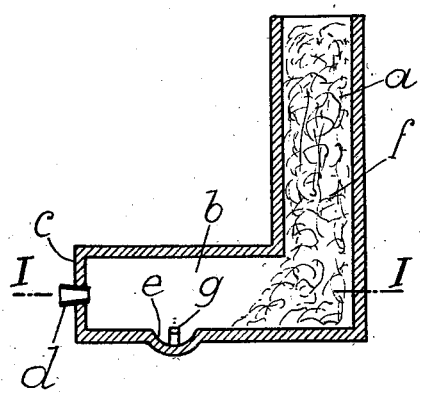
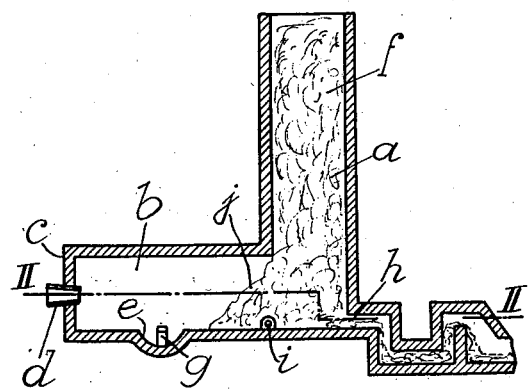
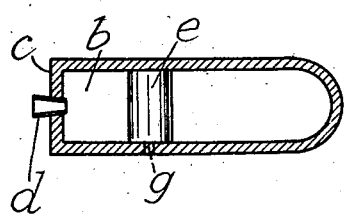
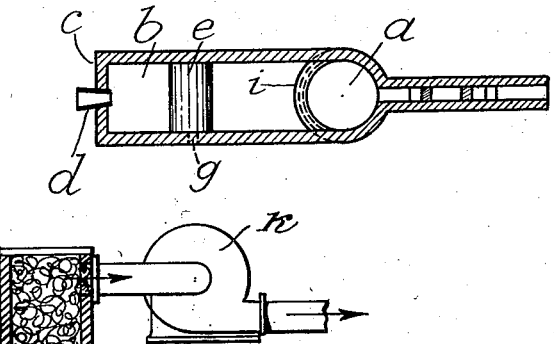
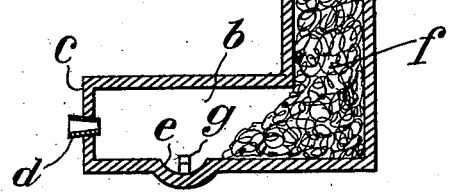
INVENTOR
KURT KUNZEL
BY
ATTORNEYS Patented July 10, 1928.

1,676,267

UNITED STATES PATENT OFFICE.

KURT KÜNZEL, OF UHSMANNSDORF, GERMANY.

PROCESS OF MAKING GLASS IN A SHAFT FURNACE.

Application filed March 18, 1927, Serial No. 176,398, and in Germany February 10, 1925.

For the manufacture of glass it had been proposed to use pits or shafts, whereby the charge for producing the molten glass is filled into said pits or shafts together with the fuel. It has further been proposed to use glass-furnaces which are constructed in the manner of a blast-furnace, whereby a proper draft is produced, the fuel and the charge being also united or mixed with each other. According to a further proposition air and fuel are introduced under pressure into the charge of a container at the bottom of the latter, whereby said container operates in a manner similar to a Bessemer converter.

These propositions, however, have not gained any practical importance, because on the one hand the glass which is produced will be colored to such an extent, that it cannot be used for practical purposes. This coloring is due to the carbon in connection with the sulphur, the manganese and other elements contained in the fuel. On the other hand, a device of the kind of the Bessemer converter could not be used for melting glass because if air and gas are separately led into the liquid glass, the temperature of the latter will be decreased at the points of the entrance of the air and the gas, so that the opening serving for the entrance of the air and the gas will soon be clogged up and prevent any air and gas from passing through the same. A development of heat, therefore, cannot take place in this case. In the most favorable case the gas and the air will come into contact with each other above the molten mass of the converter and produce at this place a cold flame which does not serve any practical purpose.

The above considerations have led to this invention, which consists essentially in carrying out the process in such a manner, that the mixture or charge, which serves for the generation of the glass, is solely filled into the shaft of the furnace, and that the flame serving for melting the material is introduced into the furnace from below. More particularly, said flame is introduced first into a space, which is not filled with the charge, and thereupon through the shaft of the furnace. In this space, which is preferably positioned at the under part of the furnace, the fuel will burn together with the air and generate a flame of white incandescence and of the proper qualities which are required for melting glass. The fuel may be used in solid, liquid or gaseous form and the furnace accordingly may be heated by combustion of dust of fuel, oil or gas. The flame is furthermore caused to operate under a proper pressure in order to overcome the resistance which is offered by the charge contained in the shaft of the furnace. It is, however, also possible, to arrange the furnace in such a manner, that the furnace gases, which are discharged at the upper part of the shaft, will be subjected to the action of a proper draft.

In the accompanying drawings there are shown two examples of a furnace serving for the process according to this invention.

Referring more particularly to the drawing, Figs. 1 and 3 are each a longitudinal section and Figs. 2 and 4 transverse sections along the lines I—I and II—II of Fig. 1 and Fig. 3 respectively. Fig. 5 shows a lengthwise section through a glass smelting furnace with suction draw.

The shaft of the furnace is designated by the letter $a$, the fore-space $b$ being rectangularly connected with said shaft. A burner $d$ is provided in the front wall of said fore-space $d$. The fore-space $d$ is equipped at its bottom with a collecting groove $e$, as shown in Figs. 1 and 2, so that the glass which comes from the charge $f$ will collect in said groove $e$, from which it will be carried off by means of a syphon $g$ and continuously conveyed into another furnace or the like serving for the further treatment of the glass.

Figs. 3 and 4 show a form of furnace according to this invention, which is especially suited for being heated by fuel in dust form. In this case the syphon, which serves for carrying the molten glass out of the furnace, is preferably provided at the sole of the shaft $a$, for instance at the point $h$. Upon the surface of the sole of the shaft $a$ there is further provided an elevated part or ascent $i$ which is of semi-circular conformation and equipped with means for cooling the same by water.

The ashes of the carbon dust will thus be molten and caught on the inclined surface $j$ of the charge. The molten dark-colored glass which is produced at this place may be let off at $g$, while the glass-material proper which is obtained by the smelting process from the charge $f$ may be discharged at the point $h$ in such a manner that it will in no way be affected by the ashes.

This latter glass-material is of somewhat greater toughness than said former dark-colored glass, and should preferably be overheated in a cleaning or purifying space which is especially provided for this purpose in front of the working furnace. In Fig. 5 a glass smelting furnace is represented which has attached a suction blast by means of which the flame produced by the burner $d$ is drawn right through the charge $f$.

I claim:

1. A process of making glass in a shaft furnace, which consists in maintaining a charge of crude glass material in said furnace and carrying a flame upwardly through said shaft and the charge therein.

2. A process of making glass in a shaft furnace, as specified by claim 1, wherein a draft is applied to the flame for the purpose of carrying the same through the charge in the furnace.

In testimony whereof I have hereunto affixed my signature.

KURT KÜNZEL.